United States Patent
Kikkawa et al.

(10) Patent No.: US 6,806,926 B1
(45) Date of Patent: Oct. 19, 2004

(54) REFLECTION-TYPE COLOR LIQUID CRYSTAL DISPLAY APPARATUS AND METHOD FOR MANUFACTURING THE SAME

(75) Inventors: Hironori Kikkawa, Tokyo (JP); Mamoru Okamoto, Tokyo (JP); Yuji Yamamoto, Tokyo (JP); Michiaki Sakamoto, Tokyo (JP); Muneo Maruyama, Tokyo (JP); Takahiko Watanabe, Tokyo (JP)

(73) Assignee: NEC LCD Technologies, Ltd. (JP)

( * ) Notice: Subject to any disclaimer, the term of this patent is extended or adjusted under 35 U.S.C. 154(b) by 230 days.

(21) Appl. No.: 09/690,330

(22) Filed: Oct. 17, 2000

(30) Foreign Application Priority Data

Oct. 18, 1999 (JP) .............................. 11-296002

(51) Int. Cl.⁷ .......................................... G02F 1/1335
(52) U.S. Cl. ..................... 349/113; 349/112
(58) Field of Search .................. 349/113, 112, 349/95, 106, 44

(56) References Cited

U.S. PATENT DOCUMENTS

| | | | | |
|---|---|---|---|---|
| 4,904,060 A | * | 2/1990 | Grupp ........................ | 349/162 |
| 5,204,765 A | | 4/1993 | Mitsui et al. ................. | 359/70 |
| 5,724,111 A | * | 3/1998 | Mizobata et al. ........... | 349/112 |
| 5,754,260 A | * | 5/1998 | Ooi et al. ..................... | 349/10 |
| 5,757,054 A | | 5/1998 | Miyawaki et al. .......... | 257/390 |
| 5,796,455 A | | 8/1998 | Mizobata et al. ........... | 349/116 |
| 5,943,107 A | * | 8/1999 | Kadota et al. ............... | 349/44 |
| 6,172,726 B1 | | 1/2001 | Matsute et al. ............. | 349/113 |

FOREIGN PATENT DOCUMENTS

| | | | | |
|---|---|---|---|---|
| JP | 04-243226 | 8/1992 | ......... | G02F/1/1335 |
| JP | 06-324358 | 11/1994 | .......... | G02F/1/137 |
| JP | 07-013146 | 1/1995 | ......... | G02F/1/1333 |
| JP | 07-056152 | 3/1995 | ......... | G02F/1/1333 |
| JP | 07-098452 | 11/1995 | ......... | G02F/1/1335 |
| JP | 08-334787 | 12/1996 | .......... | G02F/1/135 |
| JP | 08-338993 | 12/1996 | ......... | G02F/1/1335 |
| JP | 09-138427 | 5/1997 | .......... | G02F/1/136 |
| JP | 10-096918 | 4/1998 | ......... | G02F/1/1335 |
| JP | 10-206604 | * 8/1998 | | |
| JP | 11-006999 | 1/1999 | ......... | G02F/1/1333 |
| JP | 11-084415 | 3/1999 | .......... | G02F/1/136 |
| JP | 020000661186 A | * 3/2000 | | |

* cited by examiner

Primary Examiner—Dung T. Nguyen
Assistant Examiner—Thoi V. Duong
(74) Attorney, Agent, or Firm—Hayes Soloway P.C.

(57) ABSTRACT

An opposite substrate of a reflection-type color liquid crystal display apparatus has a transparent insulation substrate made of glass or the like. An uneven portion is formed on a surface of the opposite substrate on the side of a liquid crystal. A flattened film made of acryl, polyimide or the like is formed to cover the uneven portion of the transparent insulation substrate. A common opposite electrode made of ITO or the like is formed on the flattened film. A liquid crystal orientation layer made of polyimide or the like is formed on the opposite electrode. A light scattering mechanism is constituted of said uneven portion of the transparent insulation substrate and the flattened film.

5 Claims, 17 Drawing Sheets

REFLECTION-TYPE COLOR LIQUID CRYSTAL DISPLAY APPARATUS AND METHOD FOR MANUFACTURING THE SAME

BACKGROUND OF THE INVENTION

1. Field of the Invention

The present invention relates to a reflection-type color liquid crystal display apparatus and a method for manufacturing the same. More particularly, the invention relates to a reflection-type color liquid crystal display apparatus and a method for manufacturing the same, wherein a color filter is provided on a substrate where a liquid crystal driving element is formed.

2. Description of the Related Art

As display apparatuses for various information apparatuses or the like, reflection-type color liquid crystal display apparatuses are widely used. FIG. 1 is a sectional view showing a structure of one example of a conventional reflection-type color liquid crystal display apparatus. The conventional reflection-type color liquid crystal display apparatus comprises, as shown in FIG. 1, a liquid crystal driving element formation substrate 101 on which a thin film transistor (TFT) serving as a switching element (a driving element) for driving a liquid crystal is formed, an opposite substrate 102 which is opposed to the substrate 101, and a liquid crystal 103 sandwiched between both the substrates 101 and 102.

The liquid crystal driving element formation substrate 101 comprises, as shown in FIG. 1, a transparent insulation substrate 104 made of glass or the like; a gate electrode 105 and a reflection plate 106 formed of aluminum, aluminum alloy or the like, which is formed on the transparent substrate 104; a gate insulation film 107 formed of silicon nitride or the like, which is formed on the gate electrode 105 and the reflection plate 106; a semiconductor layer 108 formed of an amorphous silicon or the like, which is formed on the gate insulation film 107 above the gate electrode 105; a drain electrode 109 and a source electrode 110 formed of chromium or the like, which are connected to both ends of the semiconductor layer 108, respectively; and an insulation protection film 111 formed of silicon nitride or the like, which covers the drain electrode 109, the semiconductor layer 108 and the source electrode 110. The gate electrode 105, the gate insulation film 107, the semiconductor layer 108, the drain electrode 109 and the source electrode 110 constitute the TFT.

Furthermore, the liquid crystal driving element formation substrate 101 comprises a black matrix 112 formed on the insulation protection film 111, for preventing the incidence of light into the TFT and shielding light at a portion which is not associated with display; a color filter 113 formed on the insulation protection film 111; an insulation protection film 114 made of acryl polymer or the like, which covers the black matrix 112 and the color filter 113; a contact hole 117 formed in the insulation protection film 111, the black matrix 112 and the insulation protection film 114 so as to reach the source electrode 110, a pixel electrode 115 formed of Indium Tin Oxide (ITO) which is formed on the insulation protection film 114 so as to be connected to the source electrode 110 via the contact hole 117; and a liquid crystal orientation layer 116 formed of polyimide or the like, which is formed on the pixel electrode 115.

Furthermore, the opposite substrate 102 comprises a transparent insulation substrate 121 formed of glass or the like; a common opposite electrode 122 formed of ITO or the like which is formed on the transparent insulation substrate 121; and a liquid crystal orientation layer 123 formed of polyimide or the like, which is formed on the opposite electrode 122.

According to the conventional reflection-type color liquid crystal display apparatus having the above structure, since the black matrix 112 and the color filter 113 are formed on the liquid crystal driving element formation substrate 101, an overlap margin is not required to be taken wherein a deviation of both the substrates 101 and 102 are considered in the case of assembling the reflection-type color liquid crystal display apparatus by sandwiching the liquid crystal 103 between the liquid crystal driving element formation substrate 101 and the opposite substrate 102, so that an opening ratio can be enlarged as compared with other structures in which the black matrix 112 and the color filter 113 are formed on the opposite substrate 102, and brighter display can be provided.

In the reflection-type color liquid crystal display apparatus having the structure described above, light scattering mechanism for scattering light incident from the side of the opposite substrate 102 is required especially when a white color is displayed.

For example, Japanese Patent Application Laid-Open No. hei 11-84415 discloses one example of a reflection-type color liquid crystal display apparatus which provides a white color display as described above. FIG. 2 is a sectional view showing a structure of another conventional reflection-type color liquid crystal display apparatus. As shown in FIG. 2, the another conventional reflection-type color liquid crystal display apparatus is constituted such that a light scattering plate 125 is provided outside of the transparent insulation substrate 121 of the opposite substrate 102. In other words, the another conventional reflection-type color liquid crystal display apparatus allows the light scattering plate 125 provided outside of a panel of the opposite substrate 102 to function as light scattering mechanism to provide a white color display. Except for the above, the constitution shown in FIG. 2 is approximately the same as that shown in FIG. 1, so that respective portions of FIG. 2 corresponding to those of the conventional reflection-type color liquid crystal display apparatus shown in FIG. 1 are denoted with same reference numerals, and an explanation thereof will be omitted here.

However, since the conventional reflection-type color liquid crystal display apparatus is provided with the light scattering mechanism outside of the opposite substrate, the starting point of scattering is set at a point distant from the liquid crystal so that the contrast is lowered.

FIGS. 3 and 4 are sectional views for schematically explaining the reason why the contrast is lowered in the conventional reflection-type color liquid crystal display apparatus. In the case where the scattering plate 125 serving as the light scattering mechanism is provided outside of the opposite substrate 102, light 131A, 131B, 131C, . . . 131N incident on a specific incident light region 130 from the outside are irregularly reflected at a boundary portion between the scattering plate 125 and the opposite substrate 102 to be spread in a radial configuration. Then, after part of the irregularly reflected light is incident on the end portion of a color filter 113, for example, a R(Red) color filter 113R of an R pixel through a liquid crystal 103R (Red), it is reflected by the reflection plate 106 to pass through a B(Blue) color filter 113B of a B(Blue) pixel which is adjacent to the R pixel and a liquid crystal 103B (Blue) of the B pixel adjacent to the R pixel, and the light is emitted as abnormal light 131X. Essentially, it is desired that, after the light incident on the color filter 113R of the R pixel is reflected by the reflection plate 106, the light passes only through the color filter 113R of the R pixel and liquid crystal 103R and it is emitted as normal light 131Z. As apparent from what has been described above, the specific incident light region 130 causes the generation of color mixing or uncontrollable light.

The fact that light passes through two color filters, like light 134 shown in FIG. 4, means that color mixing is generated. On a pixel region in which red color is to be essentially displayed, a mixture of red and blue colors is displayed. Furthermore, the light passes through the liquid crystals of the two pixel regions with the result that uncontrollable light 135, in which a phase difference cannot be predicted, is generated because the light passes through liquid crystals 103R and 103B and are controlled differently from each other. Consequently, the luminance of a black display will rise, even if the color Filter 113R of the R pixel attempts to provide a black display. Naturally, in the case where the light passes through both the color filter 113B and the liquid crystal 103B of the adjacent B pixels like light 136, both of the color mixing and uncontrollable light are simultaneously generated. The degree of such color mixing and the degree of the generation of uncontrollable light become large with an increase in light which traces the same path as the abnormal light 131X described above with the result that the hue reproduction zone is narrowed and the contrast is lowered. The lowering of the contrast becomes more remarkable as the starting point of scattering generated by the scattering plate 125, namely the position where the scattering plate 125 exists becomes distant from the liquid crystal 103.

Furthermore, as shown in FIG. 4, light 136 which passes through the liquid crystal 103R of the R(red) pixel region to enter into the color filter 113B of the adjacent B(blue) pixel and passes through the liquid crystal 103B of the blue pixel region to be emitted outside becomes different from light which the blue pixel essentially intends to display, thus leading to the lowering in the contrast. Consequently, even if the light does not pass through two color filters, the contrast is lowered only when the light passes through the portion of the liquid crystal 103 in the adjacent pixel region.

Furthermore, in the reflection-type color liquid crystal display apparatus having the conventional structure, the visibility of the emitted light is deteriorated. FIG. 5 is a sectional view schematically explaining the reason why the visibility is deteriorated in the conventional reflection-type color liquid crystal display apparatus.

In the case where an observer observes a view from a front surface position 132, light reflected by the reflection plate 106 to be emitted includes generation of light 137 which is directed in a slanting direction from the boundary of the pixel except for the light 133 which is directed to the front surface position 132 with the result that this light 137 is scattered with the scattering plate 125 and part of this light 137 becomes light 138 which is directed toward the front surface position 132.

Consequently, an observer comes to observe displayed image which is deviated by a distance between the light 133 and the light 138, so that the observer observes a blurred double image thereby deteriorating the visibility thereof.

SUMMARY OF THE INVENTION

An object of the present invention is to provide a reflection-type color liquid crystal display apparatus and a method for manufacturing the same, wherein contrast and visibility can be improved in a case where a white color is displayed by providing light scattering mechanism.

According to the present invention, there is provided a reflection-type color liquid crystal display apparatus where a liquid crystal is sandwiched between a liquid crystal driving element formation substrate and an opposite substrate. A color filter is provided on the liquid crystal driving element formation substrate. Light scattering mechanism is provided on the side of the liquid crystal of the opposite substrate.

The light scattering mechanism comprises, for example, an uneven portion formed at a surface of a transparent insulation substrate which constitutes the opposite substrate. Said surface where the uneven portion is formed, is positioned on the side of the liquid crystal.

Besides, the light scattering mechanism may comprise a flattened film formed to cover the uneven portion formed at the surface of the transparent insulation substrate.

Said light scattering mechanism may comprise an uneven insulation film formed on the surface of the liquid crystal side of the transparent insulation substrate.

In this case, the light scattering mechanism may comprise a scattering auxiliary film formed on the uneven insulation film, having a different refractive index from that of the uneven insulation film.

It is preferable that the refractive index of the uneven insulation film is larger than that of the scattering auxiliary film.

Besides, it is preferable that the light scattering mechanism may have a flattened film formed to cover the uneven insulation film.

Furthermore, the light scattering mechanism may have, for example, a flattened and scattering auxiliary film formed to cover the uneven insulation film.

According to the reflection-type color liquid crystal display apparatus of the present invention, the light scattering mechanism is provided on the side of the liquid crystal of the opposite substrate, so that the starting point of scattering in the opposite substrate is set to a point near to the liquid crystal. Thus, the generation of undesired light such as mixed color light, uncontrollable light or the like can be decreased.

The present invention provides a method for manufacturing a reflection-type color liquid crystal display apparatus in which a liquid crystal is sandwiched between a liquid crystal driving element formation substrate and an opposite substrate, and a color filter is provided on the liquid crystal driving element formation substrate. The method comprises the steps of: forming a liquid crystal driving element on a first transparent insulation substrate; then, forming at least a color filter on the first transparent insulation substrate to form a liquid crystal driving element formation substrate; providing a light scattering mechanism at a surface of a second transparent insulation substrate to form an opposite substrate; and sandwiching a liquid crystal between the liquid crystal driving element formation substrate and the opposite substrate by arranging the surface of the opposite substrate where the light scattering mechanism is provided is positioned on the side of the liquid crystal.

It is preferable that the light scattering mechanism comprises an uneven portion.

The uneven portion can be formed by a processing method including, for example, a sand blast method, or a photo-etching method.

In the method for manufacturing a reflection-type color liquid crystal display apparatus of the present invention, the light scattering mechanism can be provided with a simple method because the light scattering mechanism is constituted by forming the uneven portion on the side of the liquid crystal of the opposite substrate.

Consequently, in the case where the light scattering mechanism is provided to display a white color, contrast and visibility can be improved. dr

DESCRIPTION OF THE PREFERRED EMBODIMENTS

Embodiments of the present invention will be described in detail hereinbelow with referring to the accompanied drawings.

First Embodiment

Figure 6:
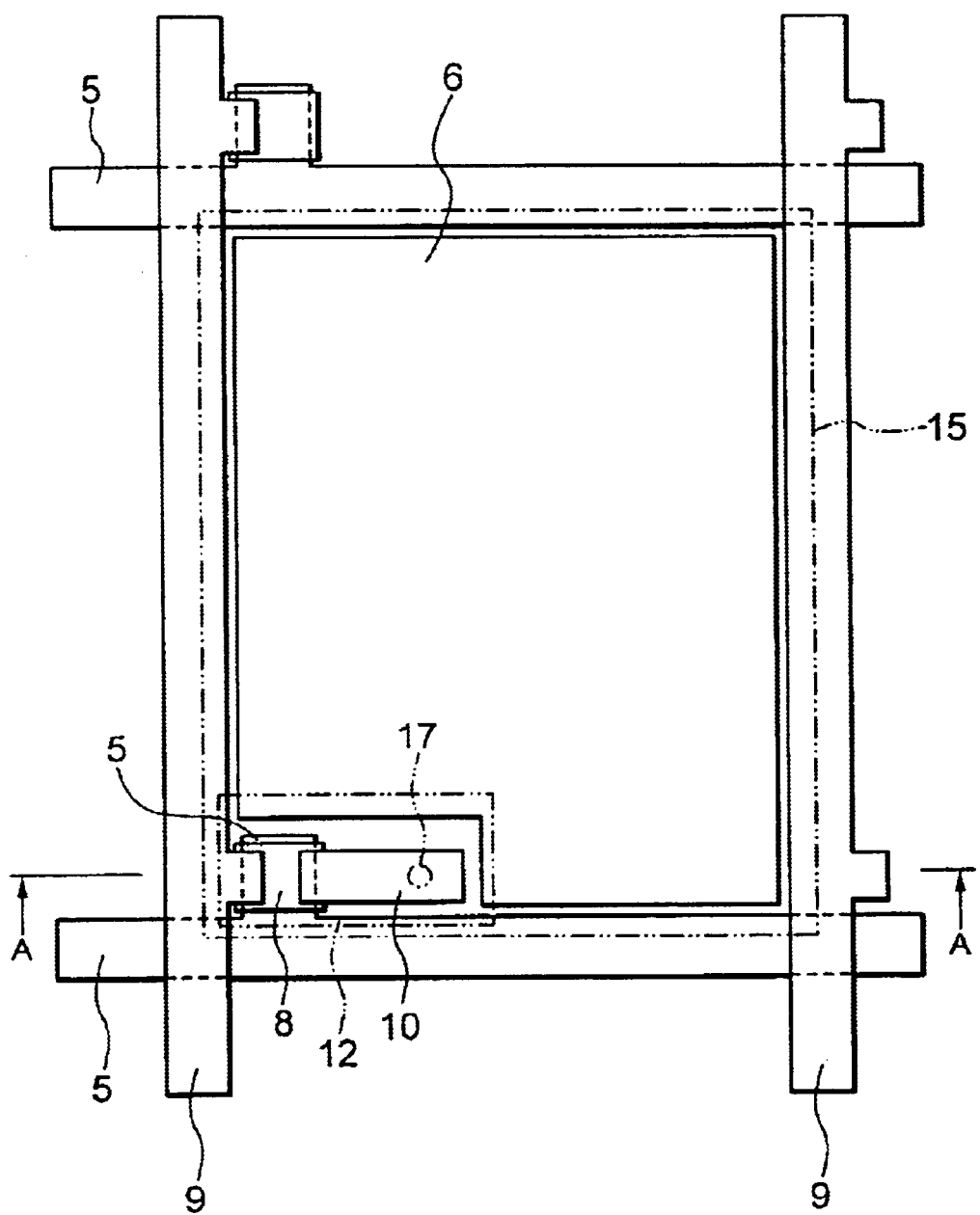
FIG. 6 is a plan view showing a structure of a reflection-type color liquid crystal display apparatus according to a first embodiment of the present invention.
Figure 7:
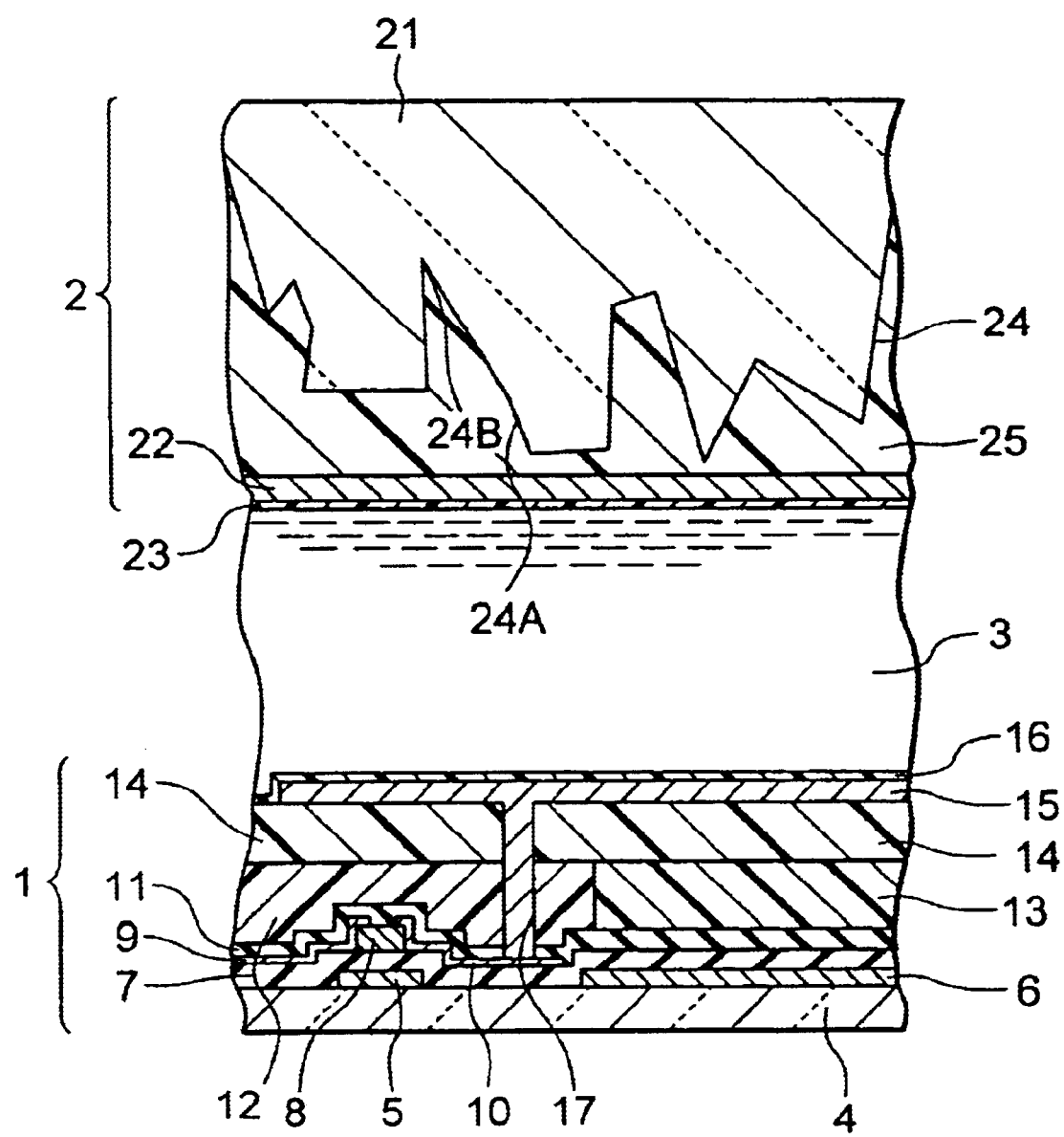
FIG. 7 is a sectional view taken along line A—A of FIG. 6.
Figure 8:
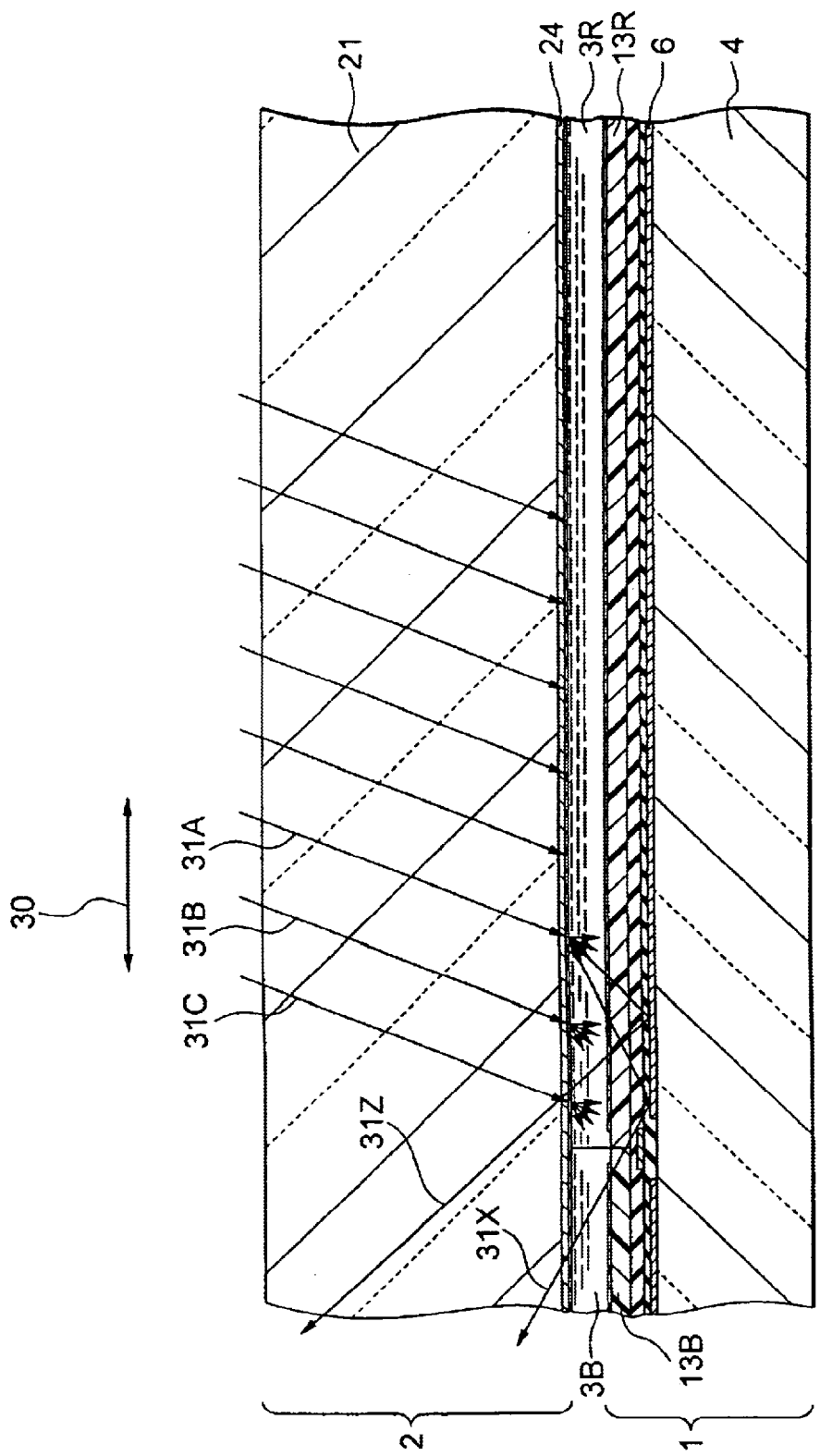
FIG. 8 is a sectional view for schematically explaining a reason why contrast is improved in the reflection-type color liquid crystal display apparatus according to the first embodiment.
Figure 9:
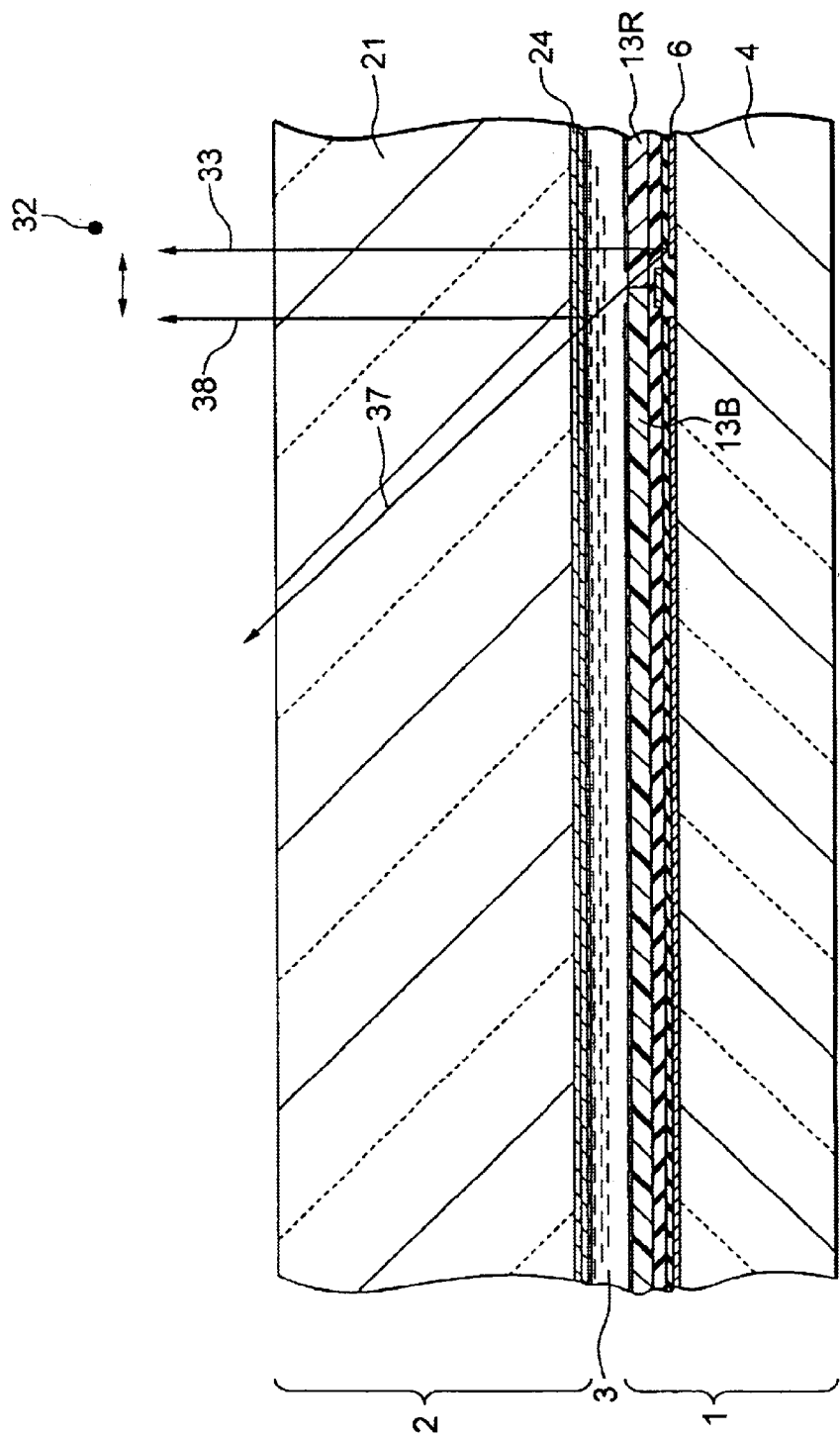
FIG. 9 is a sectional view for schematically explaining a reason why visibility is improved in the reflection-type color liquid crystal display apparatus according to the first embodiment.
Figure 12:
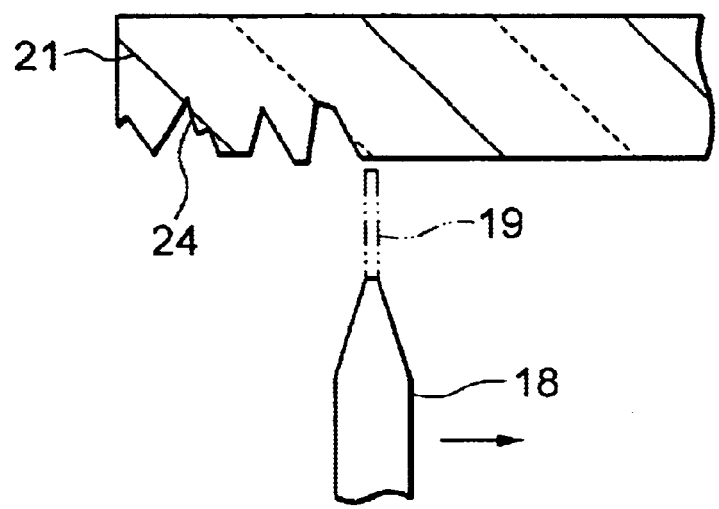
FIG. 12 is a model view showing one example of a process method for forming the light scattering mechanism in the method for manufacturing the reflection-type color display apparatus according to the first embodiment.
Figure 13:
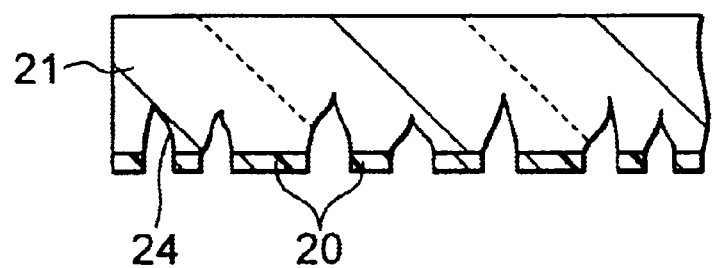
FIG. 13 is a sectional view showing another example of the process method for forming the light scattering mechanism in the method for manufacturing the reflection-type color liquid crystal display apparatus according to the first embodiment.

FIG. 6 is a plan view showing a structure of a reflection-type color liquid crystal display apparatus according to a first embodiment of the present invention. FIG. 7 is a sectional view taken along line A—A of FIG. 6. FIG. 8 is a sectional view for schematically explaining a reason why contrast is improved in the reflection-type color liquid crystal display apparatus according to the first embodiment. FIG. 9 is a sectional view for schematically explaining a reason why visibility is excellent with the reflection-type color liquid crystal display apparatus according to the first embodiment. FIGS. 10A and 10B and FIGS. 11A and 11B are sectional views showing the method for manufacturing the reflection-type color liquid crystal display apparatus according to the first embodiment in order of steps. FIG. 12 is a model view showing one example of the process method for forming light scattering mechanism in the method for method for manufacturing the reflection-type color liquid crystal display apparatus according to the first embodiment. FIG. 13 is a sectional view showing another example of the process method for forming the light scattering mechanism in the method for manufacturing the reflection-type color liquid crystal display apparatus according to the first embodiment. Incidentally, in FIG. 6, an insulation protection film 14 is not shown and a black matrix 12, a pixel electrode 15 and a contact hole 17 are denoted by a two dot chain line.

As shown in FIGS. 6 and 7, the reflection-type color liquid crystal display apparatus of the embodiment comprises a liquid crystal driving element formation substrate 1 on which a TFT is formed which operates as a switching element (a driving element), an opposite substrate 2, and a liquid crystal 3 sandwiched between substrates 1 and 2.

In the liquid crystal driving element formation substrate 1, as shown in FIGS. 6 and 7, a first transparent insulation substrate 4 is formed of glass or the like. A gate electrode 5 and the reflection plate 6 is made of aluminum or aluminum alloy and formed on the first transparent insulation substrate 4. On the gate electrode 5 and the reflection plate 6, a gate insulation film 7 is formed of silicon nitride or the like. On the gate insulation film 7 above the gate electrode 5, a semiconductor layer 8 is formed of amorphous silicon or the like. From both ends of the semiconductor layer 8, a drain electrode 9 and a source electrode 10 formed of chromium or the like are extracted, and an insulation protection film 11 is formed to cover the drain electrode 9, the semiconductor layer 8 and the source electrode 10. This insulation protection film 11 is made of silicon nitride or the like. Here, the gate electrode 5, the gate insulation film 7, the semiconductor layer 8, the drain electrode 9 and the source electrode 10 constitutes the TFT.

Furthermore, in the liquid crystal driving element formation substrate 1, a black matrix 12 is formed on the insulation protection film 11 for preventing the incidence of light into the TFT and shielding a light at a portion which is not associated with the display. A color filter 13 is formed on the insulation protection film 11. An insulation protection film 14 made of acryl polymer or the like is formed so as to cover the black matrix 12 and the color filter 13. In the insulation protection film 11, the black matrix 12 and the insulation protection film 14, a contact hole 17 is formed which attains the source electrode 10. On the insulation protection film 14, the pixel electrode 15 is formed so as to be connected to the source electrode 10 via the contact hole 17. The pixel electrode is made of ITO. On the pixel electrode 15, a liquid crystal orientation layer 16 is formed of polyimide or the like.

Furthermore, in the opposite substrate 2, an uneven portion 24 is formed on the surface of a second transparent insulation substrate 21 formed of glass or the like on the side of the liquid crystal 3. A flattened film 25 made of acryl, polyimide or the like is formed to cover the uneven portion 24 of the second transparent insulation substrate 21. On the flattened film 25, a common opposite electrode 22 is formed of ITO or the like. A liquid crystal orientation layer 23 is formed of polyimide or the like on the opposite electrode 22.

The uneven portion 24 of the second transparent insulation substrate 21 is covered with the flattened film 25 and constitutes light scattering mechanism. In other words, the first embodiment is characterized in that light scattering mechanism is provided on the side of the liquid crystal 3 of the opposite substrate 2.

Here, since the height difference of the surface of the second transparent insulation substrate 21 renders the thickness of the liquid crystal 3 even, it is desired that the thickness is 1 mm or less. For this purpose, the thickness of the flattened film 25 is required to be sufficient to cover the height difference of the uneven portion 24. Furthermore, it is desired that the height difference between a top portion 24A and a valley portion 24B is on the same level or not more than the thickness of the liquid crystal 3 (3 to 10 $\mu$m). The reason is that in the case where the reflection-type color liquid crystal display apparatus is assembled by sandwiching the liquid crystal 3 between the liquid crystal driving element formation substrate 1 and the opposite substrate 2, the uneven portion 24 does not attain the liquid crystal driving element formation substrate 1 to damage the substrate 1 even if the uneven portion 24 is not sufficiently planarized owing to the failure of the flattened film 25. The uneven portion 24 of the second transparent insulation substrate 21 is formed by the processing method such as the sand blast method or the photo-etching method and the like as described later.

As described above, in the structure of the first embodiment, the light scattering mechanism is provided on the side of the liquid crystal 3 of the opposite substrate 2 so that the starting point of scattering in the opposite substrate 2 can be set to a point near from the liquid crystal 3. Thus, the generation of undesirable light such as mixed color light or uncontrollable light is decreased and contrast can be improved because the starting point of scattering in the opposite substrate 2 can be set to a point near from the liquid crystal 3.

Figure 1:
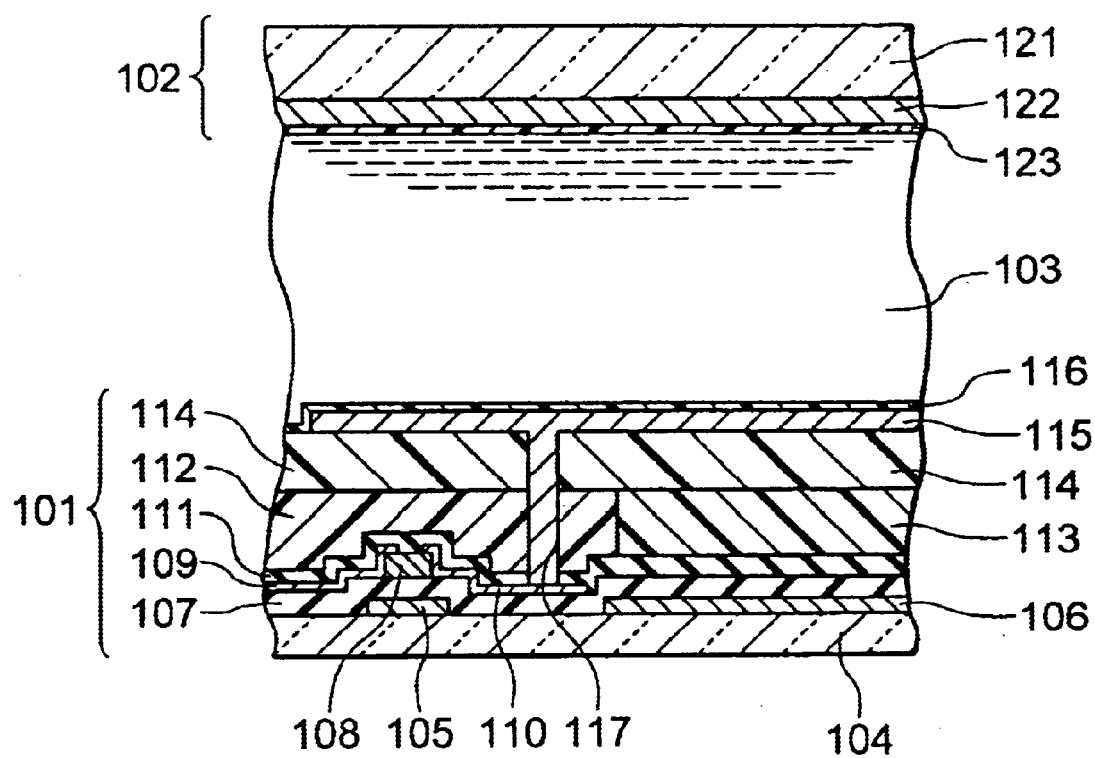
FIG. 1 is a sectional view showing a structure of one example of a conventional reflection-type color liquid crystal display apparatus.
Figure 2:
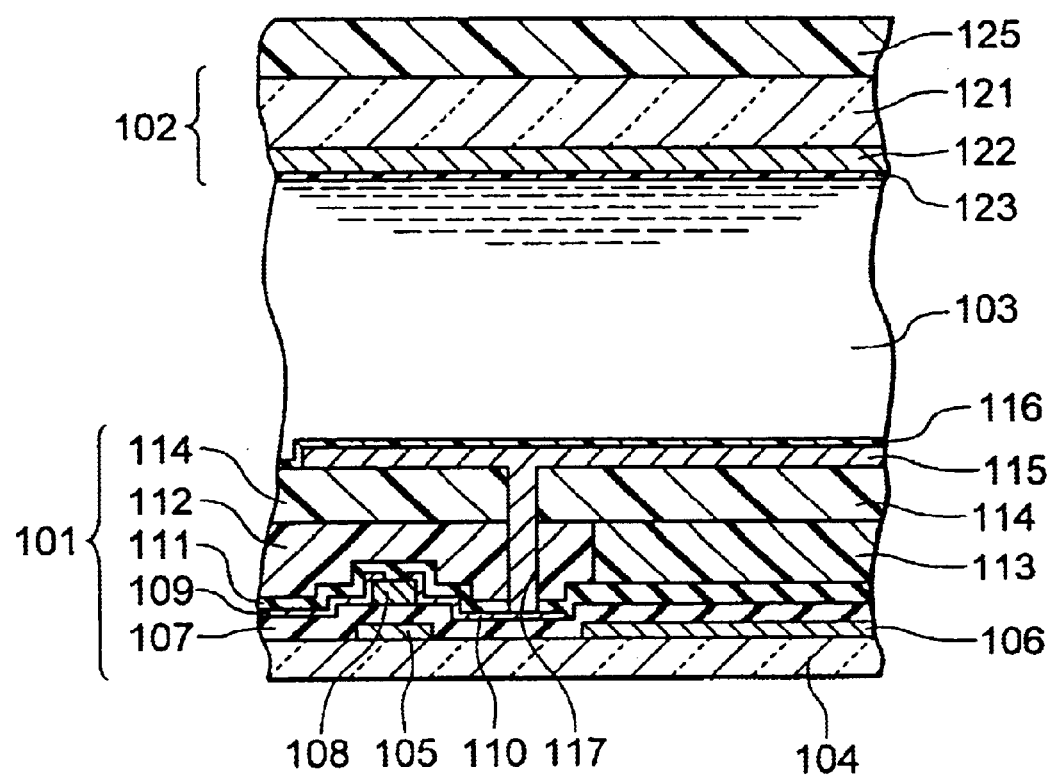
FIG. 2 is a sectional view showing a structure of another conventional reflection-type color liquid crystal display apparatus.
Figure 3:
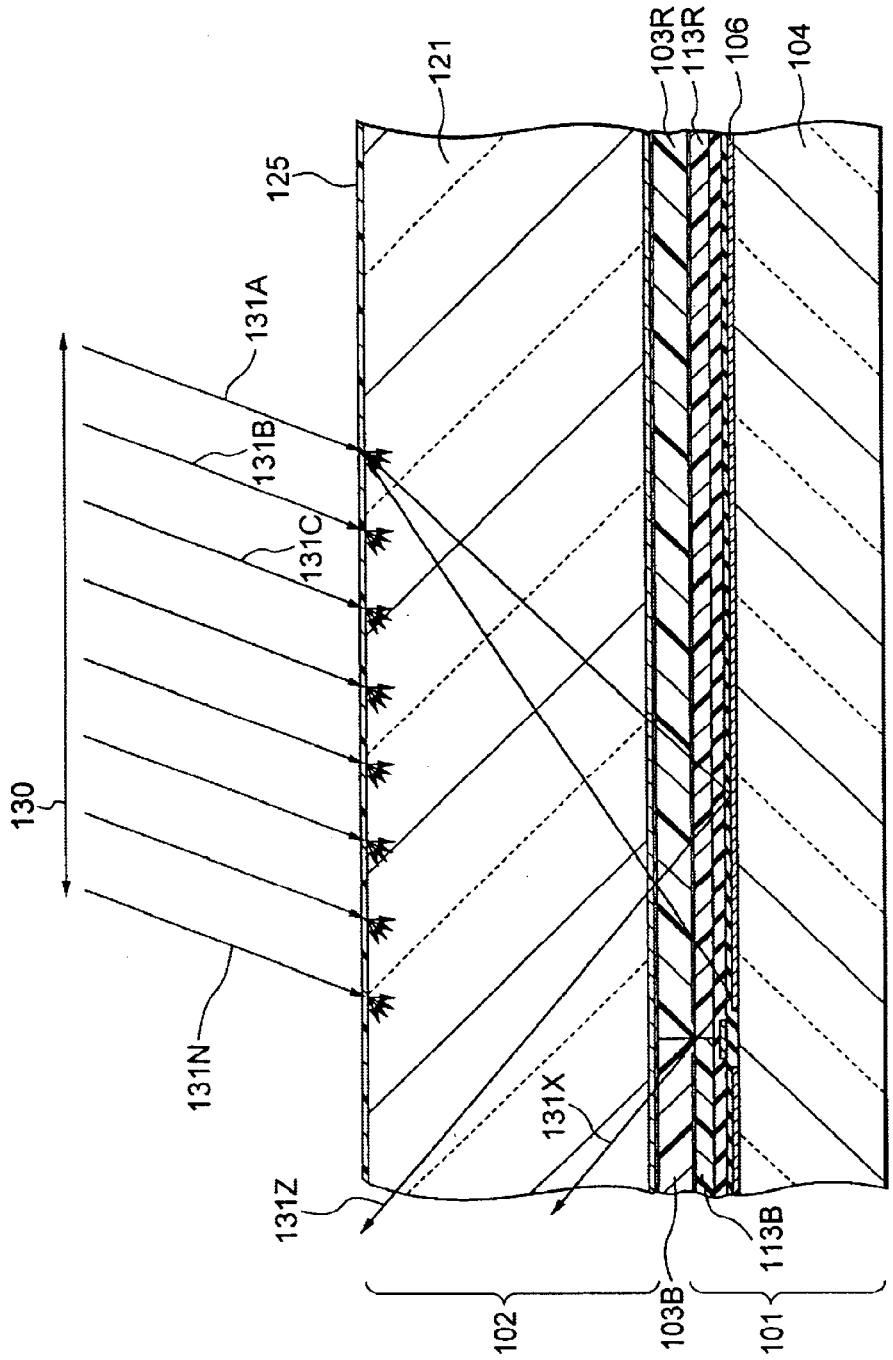
FIG. 3 is a sectional view for schematically explaining a reason why contrast is lowered in the conventional reflection-type color liquid crystal display apparatus.
Figure 4:
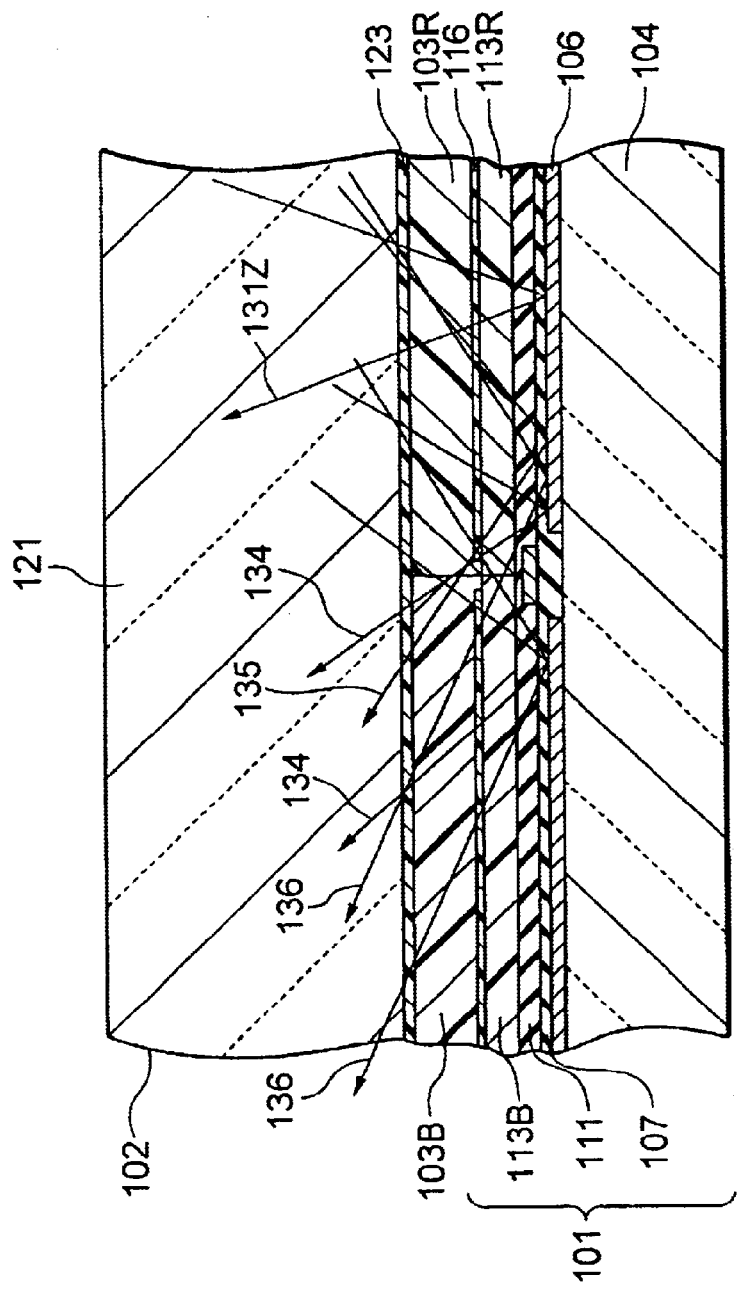
FIG. 4 is a sectional view for schematically explaining a reason why contrast is lowered in the conventional reflection-type color liquid crystal display apparatus.

FIG. 8 is a view for schematically explaining the reason why the contrast is improved. In the first embodiment, the light scattering mechanism comprising the uneven portion 24 and the flattened film 25 (not shown in FIG. 8) is provided on the side of the second transparent insulation substrate 21 with the result that the starting point of scattering is set to the point near from the liquid crystal 3 as apparent from the comparison between FIG. 8 and FIG. 3. Consequently, light 31A, 31B and 31C incident on the specific incident light region 30 is irregularly reflected with the uneven portion 24 constituting the light scattering mechanism to be reflected with the reflection plate 6 with the result that the light passes through a color filter 13B and a liquid crystal 3B of the B(Blue) pixel which is adjacent to R(Red) pixel and emitted as abnormal light 31X. As apparent from the comparison between FIG. 8 and FIG. 3, the quantity of abnormal light 31X decreases. On the other hand, after the light is incident on the color filter 13R of the R pixel to be reflected at the reflection plate 6, the quantity of normal light 31Z to be emitted only through the color filter 13R of the R pixel and the liquid crystal 3R increases. That is, the width of the specific incident light region which causes the generation of color mixing or uncontrollable light is narrower than the conventional display apparatus. As a consequence, the degree of the generation of the color mixing or uncontrollable light can be made small. Therefore, contrast and visibility can be improved.

Furthermore, according to the first embodiment, visibility can be improved in the case where light is emitted. FIG. 9 is a sectional view for schematically explaining the reason why visibility is improved.

Figure 5:
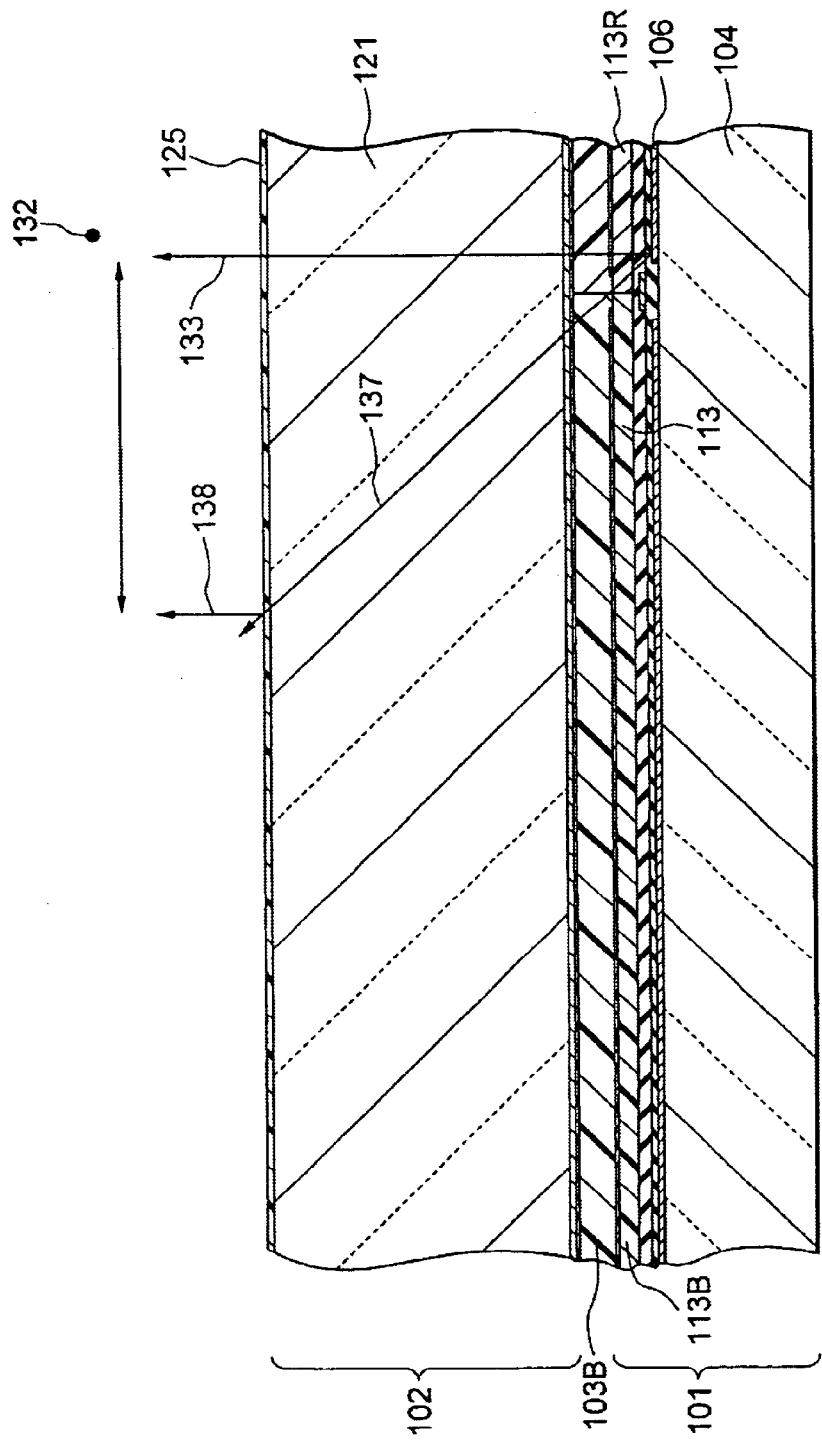
FIG. 5 is a sectional view for schematically explaining a reason why visibility is lowered in the conventional reflection-type color liquid crystal display apparatus.

In the case where the observer observes a view from the front surface position 32, light 37 is generated which is directed in a slanting direction from the boundary of the pixel except for light 33 which is directed toward the front surface position 32. This light 37 is scattered with the uneven portion 24 of the second transparent insulation substrate 21, so that part of the light 37 is converted into unusual light 38 which is directed toward the front surface position 32. In this case, since the uneven portion 24 of the second transparent insulation substrate 21 is formed on the side of the liquid crystal 3, and the starting point of scattering is set to a point near from the liquid crystal 3, the distance between light 33 and light 38 becomes small as apparent from the comparison with FIG. 5. Thus, the blurred degree of the display image can be made small for that portion. Consequently, visibility can be improved.

Next, by referring to the FIGS. 10A and 10B and FIGS. 11A and 11B, a method for manufacturing a reflection-type color liquid crystal display apparatus according to the first embodiment can be explained in order of steps.

Figure 10A:
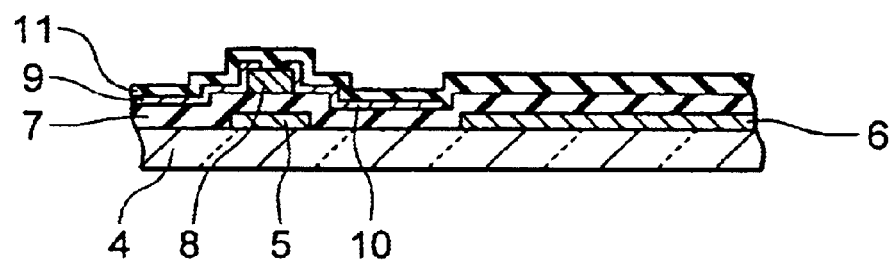
FIGS. 10A and 10B are sectional views showing a method for manufacturing a reflection-type color liquid crystal display apparatus according to the first embodiment in order of steps.

In the beginning, as shown in FIG. 10A, after an aluminum film is formed on the whole surface of the first transparent insulation substrate 4 formed of glass or the like by the sputtering method, the aluminum film is patterned with the known photolithography method, and the gate electrode 5 and the reflection plate 6 having desired configurations are formed at the same time. Since aluminum is a material which has a high reflectance, aluminum has an excellent characteristic as the reflection plate 6. Incidentally, since pure aluminum easily generates hillock, it is preferable to use aluminum alloy which is mixed with other material such as several % of neodium or the like as a reflection plate 6.

Next, silicon nitride is deposited on the whole surface of the substrate 4 by the CVD (Chemical Vapor Deposition) method to form a gate insulation film 7. Next, after an N-type amorphous silicon layer is formed on the whole surface of the substrate 4 by the CVD method, the amorphous silicon layer is patterned with the photolithography method, so that a semiconductor layer 8 is formed on the gate insulation film 7 above the gate insulation electrode 5. Next, after the chromium layer is formed on the whole surface of the substrate 4 by the sputtering method, the chromium layer is patterned with the photolithography method to form the drain electrode 9 and the source electrode 10. Next, the silicon nitride film is formed on the whole surface of the substrate 4 by CVD method to form an insulation protection film 11. This insulation protection film 11 is formed to protect the semiconductor layer 8 from the outside atmosphere. In the procedure described above, the TFT is formed which comprises the gate electrode 5, the gate insulation film 7, the semiconductor layer 8, the drain electrode 9 and the source electrode 10 which are formed on the first transparent insulation protection film 4.

Figure 10B:
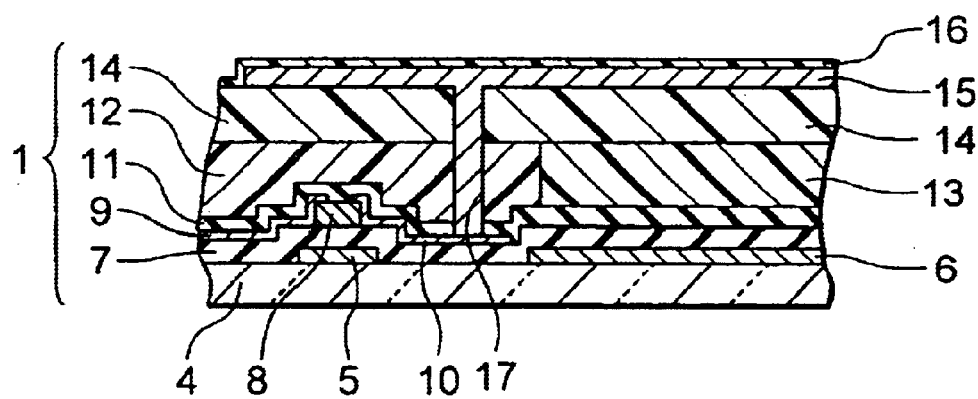

Next, as shown in FIG. 10B, after a black resist added with a black color pigment in, for example, acryl photosensitive polymer is applied on the whole surface of the substrate 4, a black resist film is patterned with the photolithography method, a black matrix 12 is formed to cover the surface of the TFT. This black matrix 12 is not necessarily required in the case where the light endurance of the TFT is sufficiently high. For example, after a resist added with red color, green-color, or blue-color pigments in, for example, acryl photosensitive polymer is applied on the whole surface of the substrate 4, the resist film is patterned with the photolithography method followed by forming a color filter 13 on the insulation protection film 11. Next, on the black matrix 12 and the color filter 13, an insulation protection film 14 is formed of, for example, acryl polymer or the like. This insulation protection film 14 is formed to prevent the mixture of toxic material such as ions or the like from the black matrix 12 and/or the color filter 13 into the liquid crystal 3 formed as described later.

Next, after a contact hole 17 is formed which exposes the source electrode 10 by the photolithography method in the black matrix 12 and the insulation protection film 14, an ITO film is formed on the whole surface of the substrate 4 including this contact hole 17 by the sputtering method followed by patterning the ITO film with the photolithography method to form a pixel electrode 15 having a desired configuration. Next, a liquid crystal orientation layer 16 is formed of polyimide on the pixel electrode 15.

In the above procedure, a substrate 1 on which a liquid crystal driving element is formed is obtained.

Figure 11A:
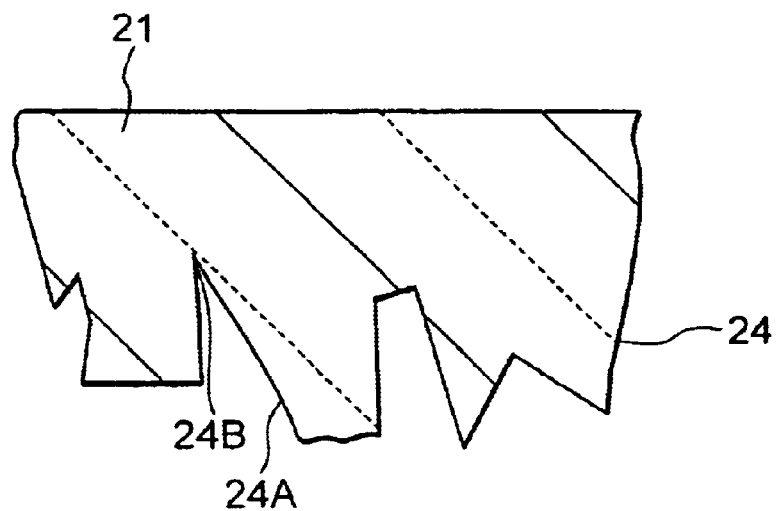
FIGS. 11A and 11B are sectional view showing the method for manufacturing the reflection-type color liquid crystal display apparatus according to the first embodiment of the next step of FIG. 10B in order of steps thereof.

Next, as shown in FIG. 11A, the surface (the surface which constitutes a side of a liquid crystal 3) of the second transparent insulation substrate 21 which is formed of glass or the like and having a thickness of 0.5 to 1.5 mm, is processed or worked to form an uneven portion 24. The uneven portion 24 is formed in such a manner that the height difference between a top portion 24A and a valley portion 24B becomes the same or not more than the thickness (3 to 10 $\mu$m) of the liquid crystal 3 used in the case where the reflection-type color liquid crystal display apparatus is assembled later.

Here, as a process method for forming the uneven portion 24 on the second transparent insulation substrate 21, the sand blast method as shown in FIG. 12 is used to form the uneven portion 24. That is, on a surface opposite to the liquid crystal 3 of the second transparent insulation substrate 21, the uneven portion 24 is formed by blowing a ground powder 19 from the grinding nozzle 18. In this case, the powder diameter of the grinding powder 19, and the blowing speed is adjusted so that the roughness and the depth of the uneven portion 24 is controlled.

Furthermore, as another processing method for forming the uneven portion 24 on the second transparent insulation substrate 21, the photo-etching method as shown in FIG. 13 is used. That is, after a resist film 20 is formed at random on the surface of the second transparent insulation film 21 opposite to the liquid crystal 3, the uneven portion 24 is formed by the dry etching and the photo-etching by using this resist film 20 as a mask. In this case, since a highly fine mask can be formed by forming the resist film 20 with the photolithography method, so that the roughness and the depth of the uneven portion 24 can be controlled to desired range.

Figure 11B:
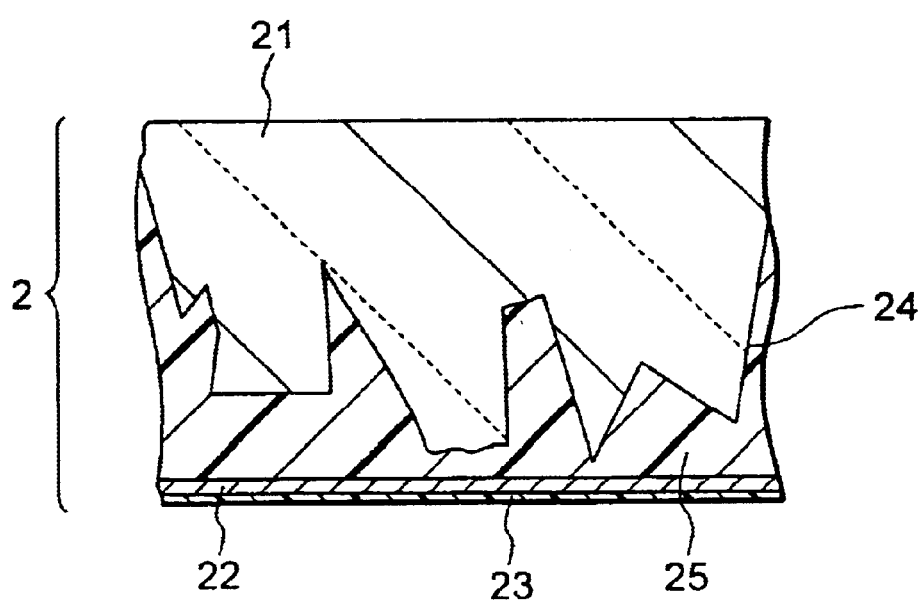

Next, as shown in FIG. 11B, an acryl film or a polyimide film is formed by such as the SOG (Spin On Glass) method or the printing method, so that a flattened film 25 is formed to cover the uneven portion 24 of the second transparent insulation film substrate 21. As a consequence, light scattering mechanism is formed by the uneven portion 24 and the flattened film 25. Next, an ITO film is formed on the whole surface of the substrate 21 by the sputtering method to form a common opposite electrode 22. Then, a liquid crystal orientation layer 23 is formed of polyimide on the opposite electrode 22.

Through such a procedure, the opposite substrate 2 is formed.

Next, the reflection-type color liquid crystal display apparatus is completed which has a structure as shown in FIGS. 6 and 7, by sandwiching a liquid crystal 3 formed of, for example, a nematic liquid crystal between the liquid crystal driving element formation substrate 1 and the opposite substrate 2 obtained in the above process to arrange the uneven portion 24 of the opposite substrate 2 to be placed on the side of the liquid crystal 3.

In this manner, in the reflection-type color liquid crystal display apparatus having a structure of the first embodiment, the opposite substrate 2 which comprises a second transparent insulation substrate 21 formed of glass or the like and having an uneven portion 24 on the side of the liquid crystal 3, a flattened film 25 formed of acryl or polyimide so as to cover the uneven portion 24 of the second transparent insulation substrate 21, a common opposite electrode 22 formed of ITO or the like on the flattened film 25 and a liquid crystal orientation layer 23 is formed, and the light scattering mechanism is constituted of the uneven portion 24 and the flattened film 25 with the result that the starting point of scattering on the opposite substrate 2 can be set to a point near from the liquid crystal 3 thereby making it possible to decrease the generation of undesirable light such as mixed color light or uncontrollable light.

Furthermore, in the reflection-type color liquid crystal display apparatus having a structure of the first embodiment, since the light scattering mechanism is constituted by forming the uneven portion 24 of the second transparent insulation substrate 21 on the side of the liquid crystal 3, the light scattering mechanism can be provided in an easy method.

Consequently, in the case where a white color is displayed by the light scattering mechanism, contrast and visibility can be improved.

Second Embodiment

Figure 14:
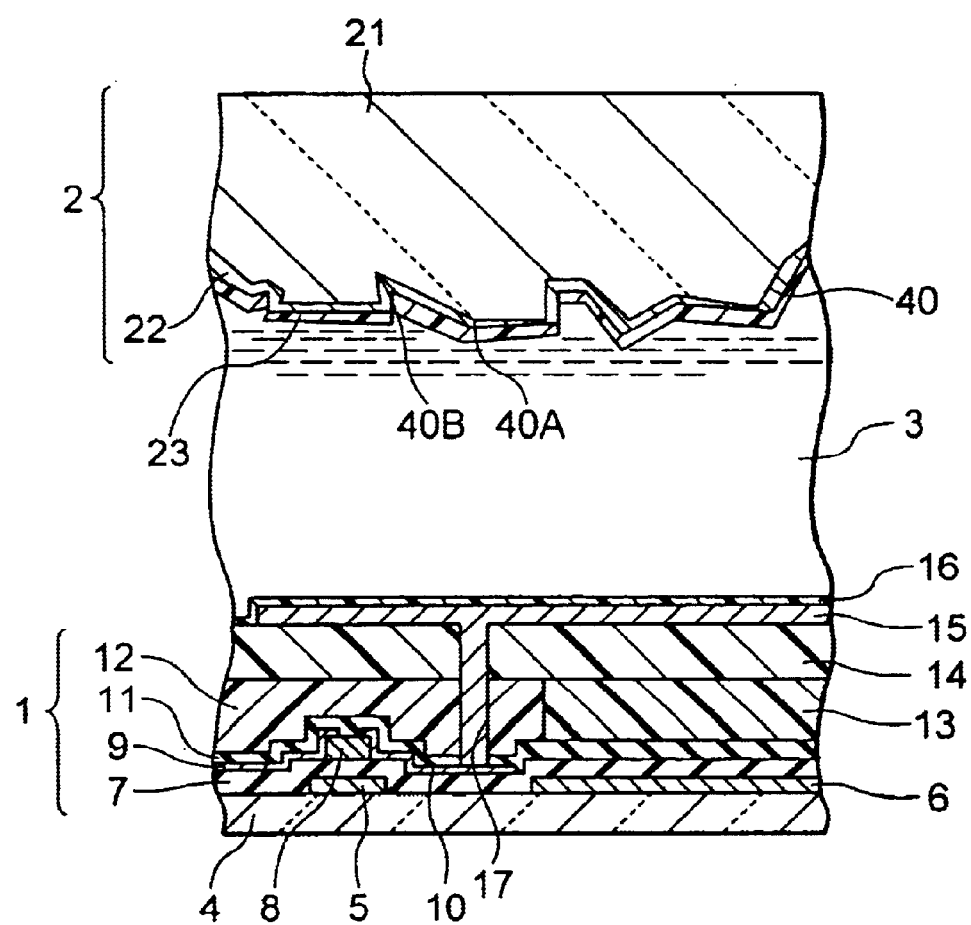
FIG. 14 is a sectional view showing a structure of the reflection-type color liquid crystal display apparatus according to a second embodiment of the present invention.

FIG. 14 is a sectional view showing a structure of the reflection-type color liquid crystal display apparatus according to a second embodiment of the present invention. The point in which the reflection-type color display apparatus is largely different from the structure of the first embodiment described above is that the uneven portion 40 has decreased degree of the unevenness, the formation of the flattened film 25 is made unnecessary.

That is, in the second embodiment, as shown in FIG. 14, the uneven portion 40 formed on the side of liquid crystal 3 of the second transparent insulation substrate 21 is such that the height difference between the top portion 40A and the valley portion 40B is smaller than the case of the first embodiment, and is formed to a thickness of approximately 1 μm or less thereby constituting light scattering mechanism. On the uneven portion 40, a common opposite electrode 22 is formed of ITO or the like, and on the opposite electrode 22, a liquid crystal orientation layer 23 is formed of polyimide or the like respectively. In this manner even when the light scattering mechanism is constituted by forming an uneven portion 40 having a small degree of unevenness, the light scattering mechanism can display a sufficient function.

As the process method for forming the uneven portion 40, in the same manner as the case of the first embodiment, the sand blast method shown in FIG. 12 and the photo-etching method shown in FIG. 13 can be used. In particular, in the case of the second embodiment, it is desirable to use the photo-etching method which enables a high precision processing.

Except for the above, the second embodiment is approximately the same as the first embodiment. Consequently, in FIG. 14, each portion corresponding to the constituent portion of the first embodiment shown in FIGS. 6 and 7 are denoted by same reference numerals, and an explanation thereof will be omitted.

In this manner, with the structure of the second embodiment, approximately the same advantage can be provided as has been described in the first embodiment.

In addition, according to the structure of the second embodiment, the planarization (formation of a flattened film) is further made unnecessary.

Third Embodiment

Figure 15:
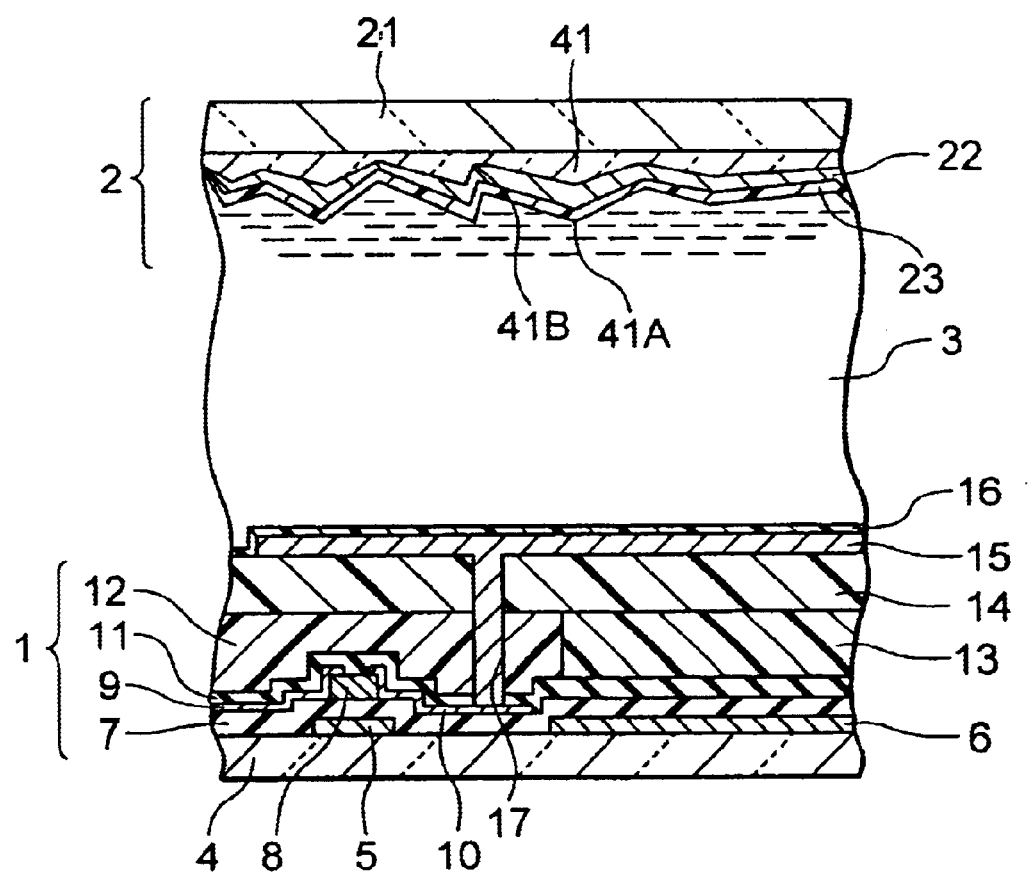
FIG. 15 is a sectional view showing a structure of the reflection-type color liquid crystal display apparatus according to a third embodiment of the present invention.

FIG. 15 is a sectional view showing a structure of a reflection-type color liquid crystal display apparatus according to a third embodiment of the present invention. The point in which the structure of the reflection-type color liquid crystal display apparatus according to the third embodiment of the invention is largely different from the structure of the first embodiment lies in the fact that the uneven insulation film 41 is formed on the surface of the transparent insulation substrate 21, the formation of the uneven configuration on the substrate 21 itself is made unnecessary so that the light scattering mechanism is constituted.

That is, in the third embodiment, as shown in FIG. 15, for example, an acryl film and a polyimide film are formed on the side of the liquid crystal 3 on the surface of the second transparent insulation substrate 21 to form the uneven insulation film 41. The height difference between the top portion 41A and the valley portion 41B of the uneven insulation film 21 is formed on the same degree as the second embodiment. On the uneven insulation film 41, a common opposite electrode 22 is formed of ITO or the like, and on the opposite electrode 22, a liquid crystal orientation layer 23 is formed of polyimide or the like. In this manner, even when the light scattering mechanism is constituted of the uneven insulation film 41 formed on the second transparent insulation film 21, the light scattering mechanism can display a sufficient function.

As a method for forming the uneven insulation film 41, a resist is applied on the surface of the second transparent insulation substrate 21 at random after an acryl film or a polyimide film is formed by the SOG method or the printing method on the second transparent insulation substrate 21, then the uneven insulation film 41 can be formed by etching the acryl film or the polyimide film using the resist as a mask and removing the resist.

The third embodiment is approximately the same as the first embodiment described above except for what has been described above. Consequently, in FIG. 15, each portion corresponding to the constituent portions of the first embodiment shown in FIGS. 6 and 7 are denoted by like reference numerals, and an explanation thereof will be omitted.

In this manner, with the structure of the third embodiment, approximately the same advantage can be obtained with the constitution of the first embodiment.

In addition, the formation of the uneven portion can be made easy in the constitution of the third embodiment than the formation thereof on the substrate 21 itself.

Fourth Embodiment

Figure 16:
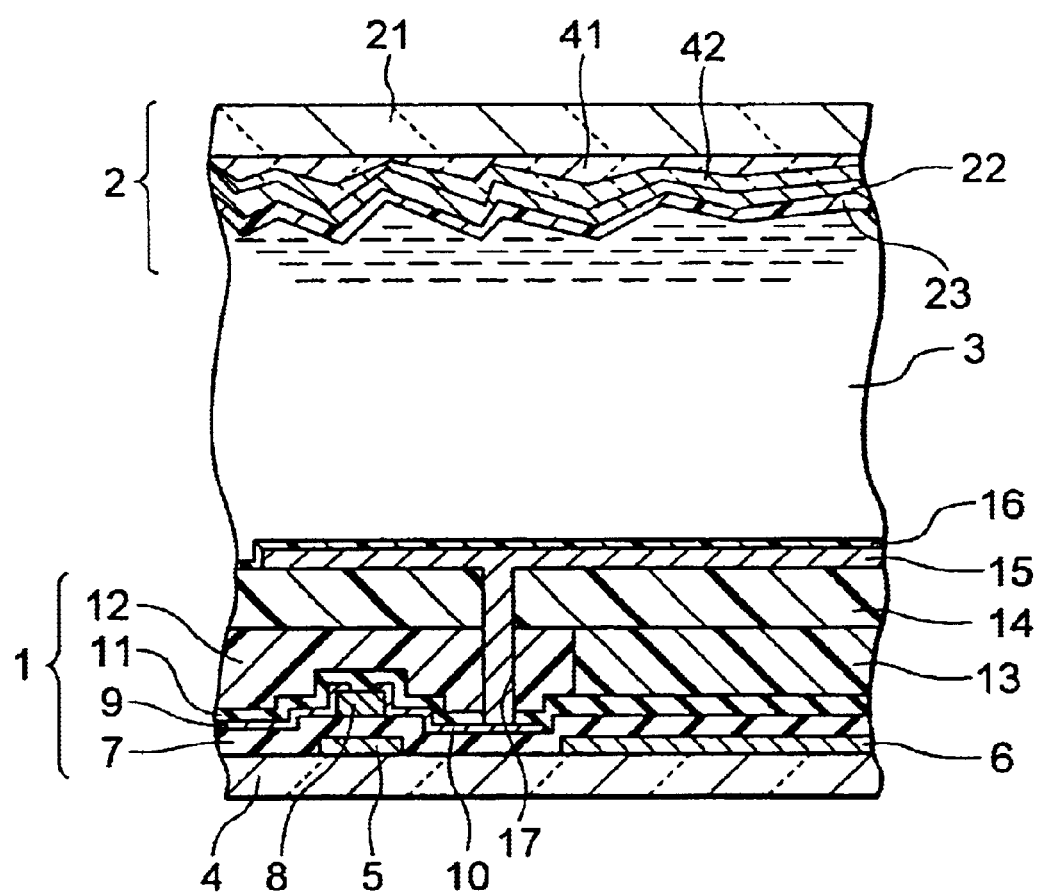
FIG. 16 is a sectional view showing a structure of the reflection-type color liquid crystal display apparatus according to a fourth embodiment of the present invention.

FIG. 16 is a sectional view showing a structure of a reflection-type color liquid crystal display apparatus according to the fourth embodiment of the present invention. The point in which the reflection-type color liquid crystal display apparatus according to the fourth embodiment of the present invention is largely different from the structure of the third embodiment described above lies in the fact that the uneven insulation film 41 formed on the surface of the transparent insulation substrate 21 and a light scattering auxiliary film 42 having a different refractive index constitute the light scattering mechanism.

That is, in the fourth embodiment, as shown in FIG. 16, an uneven insulation film 41 formed on the surface of the second transparent insulation film 21 on the side of the liquid crystal 3 and a scattering auxiliary film 42 formed on the uneven insulation film 41 and having a refractive index different from the uneven insulation film 41 constitute the light scattering mechanism. In this case, the relation between the refractive index n1 of the uneven insulation film 41 and the refractive index n2 of the scattering auxiliary film 42 is set to be n1>n2. On the scattering auxiliary film 42, a common opposite electrode 22 is formed of ITO or the like and, on the opposite electrode 22, a liquid crystal orientation layer 23 is formed of polyimide or the like. Even when the light scattering mechanism is constituted with the combination of the uneven insulation film 41 and the scattering auxiliary film 42 which have different refractive index each other, the light scattering mechanism can show a sufficient function.

In this manner, with the structure of the fourth embodiment, the fourth embodiment can provide approximately the same advantage as described in the third embodiment.

In addition, with the structure of the fourth embodiment, the fourth embodiment can control the degree of scattering with the scattering auxiliary film 42.

Fifth Embodiment

Figure 17:
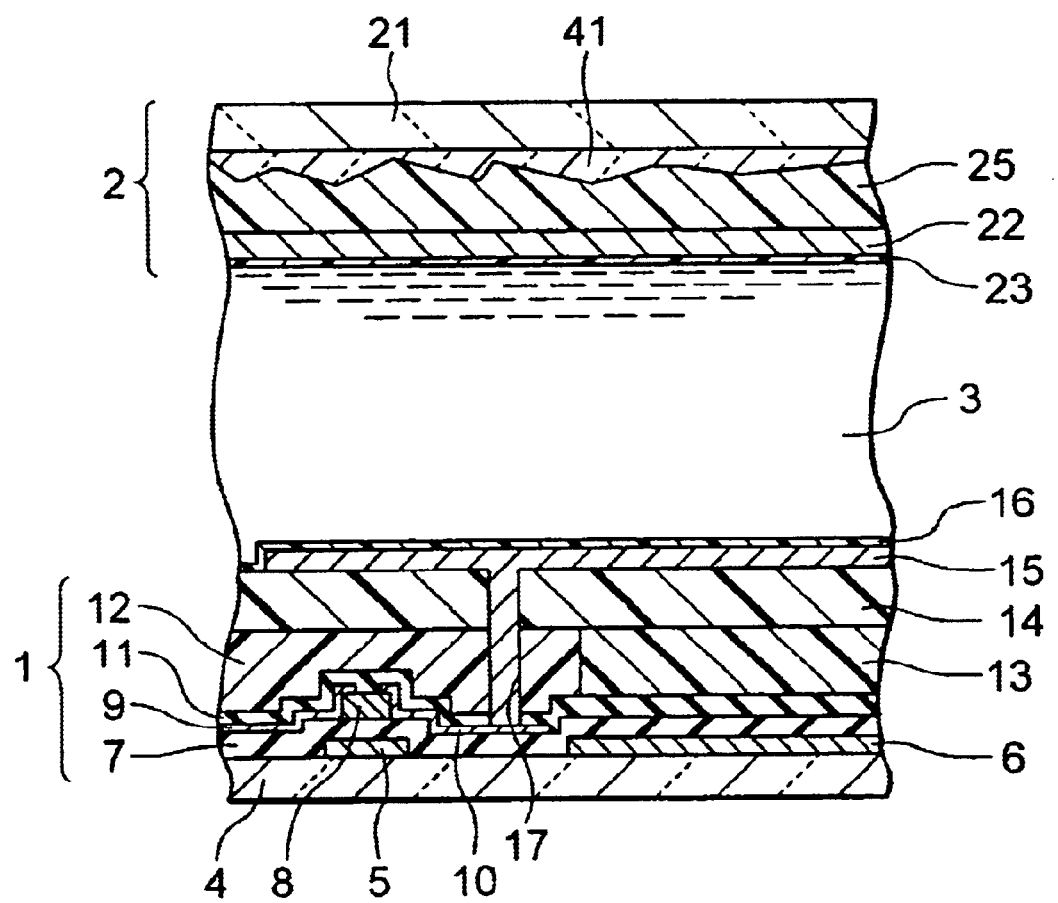
FIG. 17 is a sectional view showing a structure of the reflection-type color liquid crystal display apparatus according to a fifth embodiment of the present invention.

FIG. 17 is a sectional view showing a structure of a reflection-type color liquid crystal display apparatus according to a fifth embodiment of the invention. The point in which the structure of the reflection-type color liquid crystal display apparatus which is the fifth embodiment of the present invention is largely different from the structure of the third embodiment is that the uneven insulation film 41 formed on the surface of the transparent insulation substrate 21 and the flattened film 25 constitute the light scattering mechanism.

That is, in the present embodiment, as shown in FIG. 17, on the surface of the second transparent insulation substrate 21 on the side of the liquid crystal 3, for example, an acryl film or a polyimide film is formed to form an uneven insulation film 41, and the uneven insulation film 41 is covered with the flattened film 25 to constitute the light scattering mechanism. On the flattened film 25 the common opposite electrode 22 is formed of ITO or the like, and on the opposite electrode 22, a liquid crystal orientation layer 23 is formed of polyimide or the like, respectively. In this manner, even when the uneven insulation film 41 and the flattened film 25 formed on the surface of the second transparent insulation film 21 constitute the light scattering mechanism, the light scattering mechanism can show a sufficient function.

In this manner, with the structure of the fifth embodiment, the fifth embodiment can provide approximately the same advantage as described in the third embodiment.

Sixth Embodiment

Figure 18:
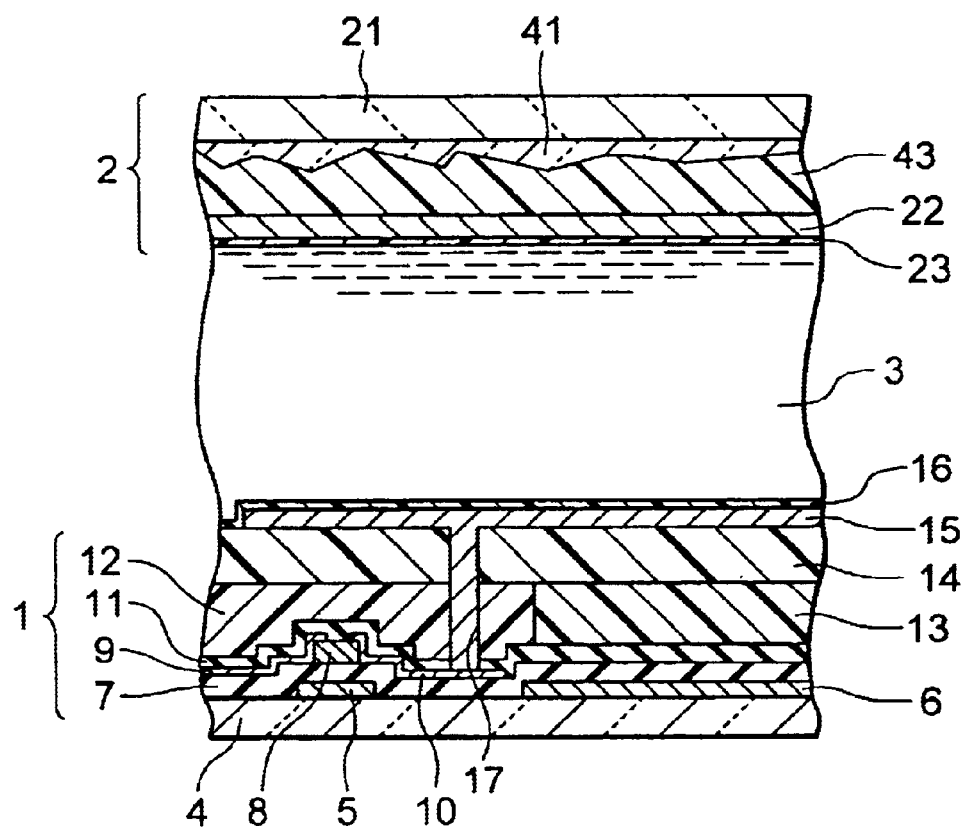
FIG. 18 is a sectional view showing a structure of the reflection-type color liquid crystal display apparatus according to a sixth embodiment of the present invention.

FIG. 18 is a sectional view showing a structure of a reflection-type color liquid crystal display apparatus according to a sixth embodiment of the present invention. The point in which the structure of the reflection-type color liquid crystal display apparatus which is the sixth embodiment is largely different from the fifth embodiment described above lies in the fact that an uneven insulation film 41 formed on the transparent insulation substrate 21 and a flattened and scattering auxiliary film 43 formed on the uneven insulation film 41 constitute the light scattering mechanism.

That is, in the sixth embodiment, as shown in FIG. 18, an acryl film or a polyimide film is formed on the surface of the second transparent insulation substrate 21 on the side of the liquid crystal 3 to form an uneven insulation film 41 is formed so that the uneven insulation film 41 is covered, and then a flattened and a scattering auxiliary film 43 is formed on the uneven insulation film 41 to constitute the light scattering mechanism. On the flattened and scattering auxiliary film 43, the common opposite electrode 22 is formed of ITO or the like, and on the opposite electrode 22, a liquid crystal orientation layer 23 is formed of polyimide or the like, respectively. In this manner, even when the light scattering mechanism is constituted of the uneven insulation film 41 formed on the flattened and scattering auxiliary film 43 formed on the uneven insulation film 41, the light scattering mechanism can show a sufficient function.

In this manner, with the structure of the sixth embodiment, the sixth embodiment can provide approximately the same advantage.

Thus, the embodiment of the present invention has been described in detail, but the concrete structure is not restricted to the above embodiment. The change in the design which is not deviated from the scope of the gist of the present invention is also included in the present invention. For example, as a switching element for driving the liquid crystal, there is shown an example using the TFT as the switching element for driving the liquid crystal. The present invention is not restricted thereto. Other switching element such as a diode or the like can be used.

Furthermore, as the liquid crystal driving element formation substrate, a transparent insulation substrate is used to form a switching element thereon. The present invention is not restricted thereto. Other substrate such as the semiconductor substrate formed of the silicon substrate or the like is used to formed of the switching element. Furthermore, one example is shown with respect to the conditions such as method for forming each kind of insulation film and conductive film or the like, the thickness thereof and the like, it can be modified according to purpose or use.

What is claimed is:

1. A reflection-type color liquid crystal display apparatus comprising:

a liquid crystal driving element formation substrate on which a liquid crystal driving clement is formed;

an opposite substrate which is opposite to said liquid crystal driving element formation substrate;

a liquid crystal sandwiched between said liquid crystal driving element formation substrate and said opposite substrate;

a color filter provided on the driving element formation substrate; and a light scattering mechanism provided at the liquid crystal side surface of the opposite substrate; wherein said opposite substrate has a transparent insulation substrate, and said light scattering mechanism comprises an uneven portion formed at the surface of the liquid crystal side of said transparent insulation substrate; and wherein said light scattering mechanism comprises a flattened film formed to cover the uneven portion formed at the surface of the transparent insulation substrate.

2. A reflection-type color liquid crystal display apparatus comprising:

a liquid crystal driving element formation substrate on which a liquid crystal driving element is formed;

an opposite substrate which is opposite to said liquid crystal driving element formation substrate;

a liquid crystal sandwiched between said liquid crystal driving element formation substrate and said opposite substrate;

a color filter provided on the driving element formation substrate; and a light scattering mechanism provided at the liquid crystal side surface of the opposite substrate, and wherein said opposite substrate has a transparent insulation substrate, and said light scattering mechanism comprises an uneven insulation film formed on the surface of the liquid crystal side of the transparent insulation substrates; and wherein said light scattering mechanism comprises a flattened film formed to cover the uneven insulation film.

3. A reflection-type color liquid crystal display apparatus comprising:

a liquid crystal driving element formation substrate on which a liquid crystal driving element is formed;

an opposite substrate which is opposite to said liquid crystal driving element formation substrate;

a liquid crystal sandwiched between said liquid crystal driving element formation substrate and said opposite substrate;

a color filter provided on the driving element formation substrate; and a light scattering mechanism provided at the liquid crystal side surface of the opposite substrate; wherein said opposite substrate has a transparent insulation substrate; and wherein said light scattering mechanism comprises an uneven insulation film formed oil the surface of the liquid crystal side of the transparent insulation substrate; and wherein said light scattering mechanism comprises a scattering auxiliary film formed on the uneven insulation film and having a refractive index different from that of the uneven insulation film.

4. The reflection-type color liquid crystal display apparatus according to claim 3, wherein said refractive index of the uneven insulation film is larger than of the scattering auxiliary film.

5. A reflection-type color liquid crystal display apparatus comprising:

a liquid crystal driving element formation substrate on which a liquid crystal driving element is formed;

an opposite substrate which is opposite to said liquid crystal driving element formation substrate;

a liquid crystal sandwiched between said liquid crystal driving element formation substrate and said opposite substrate;

a color filter provided on the driving element formation substrate; and a light scattering mechanism provided at the liquid crystal side surface of the opposite substrate; wherein said opposite substrate has a transparent insulation substrate; and wherein said light scattering mechanism comprises an uneven insulation film formed on the surface of the liquid crystal side of the transparent insulation substrate; and wherein said light scattering mechanism comprises a flattened and scattering auxiliary film formed to cover the uneven insulation film.

* * * * *